INVENTOR
ROBERT M. PAGE

BY

ATTORNEYS

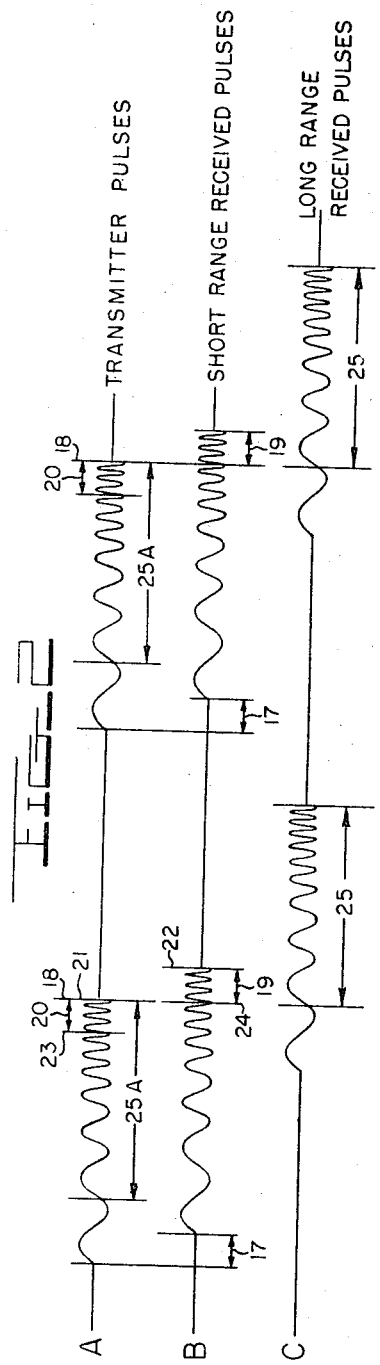
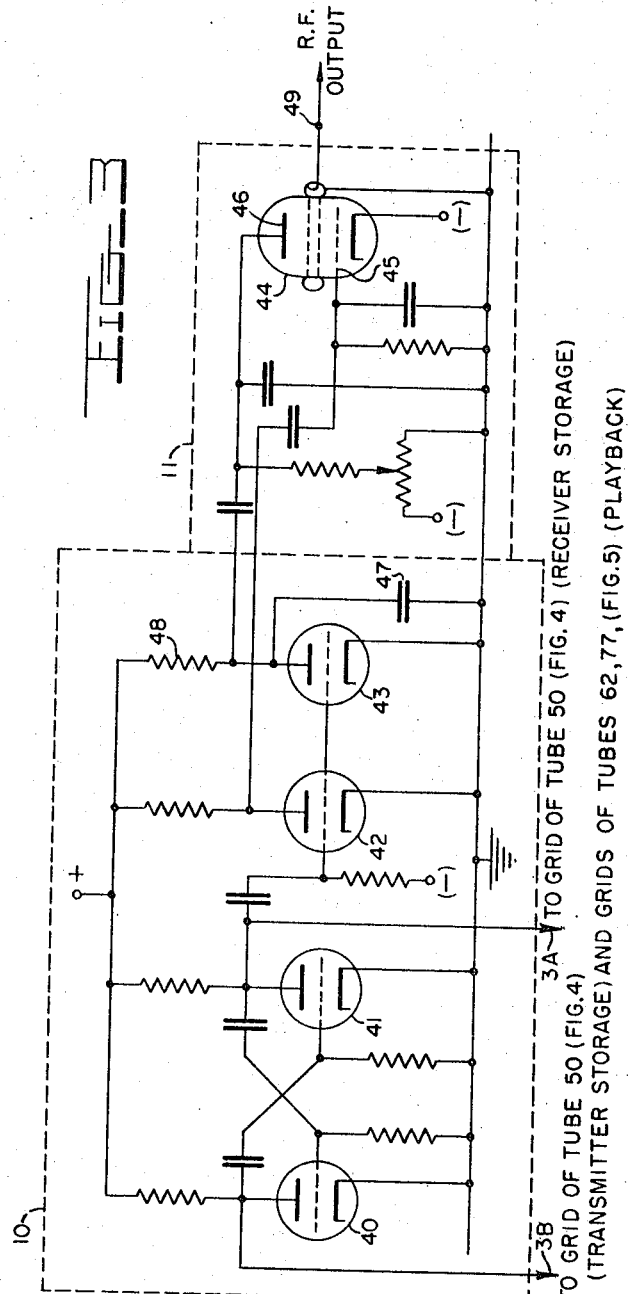

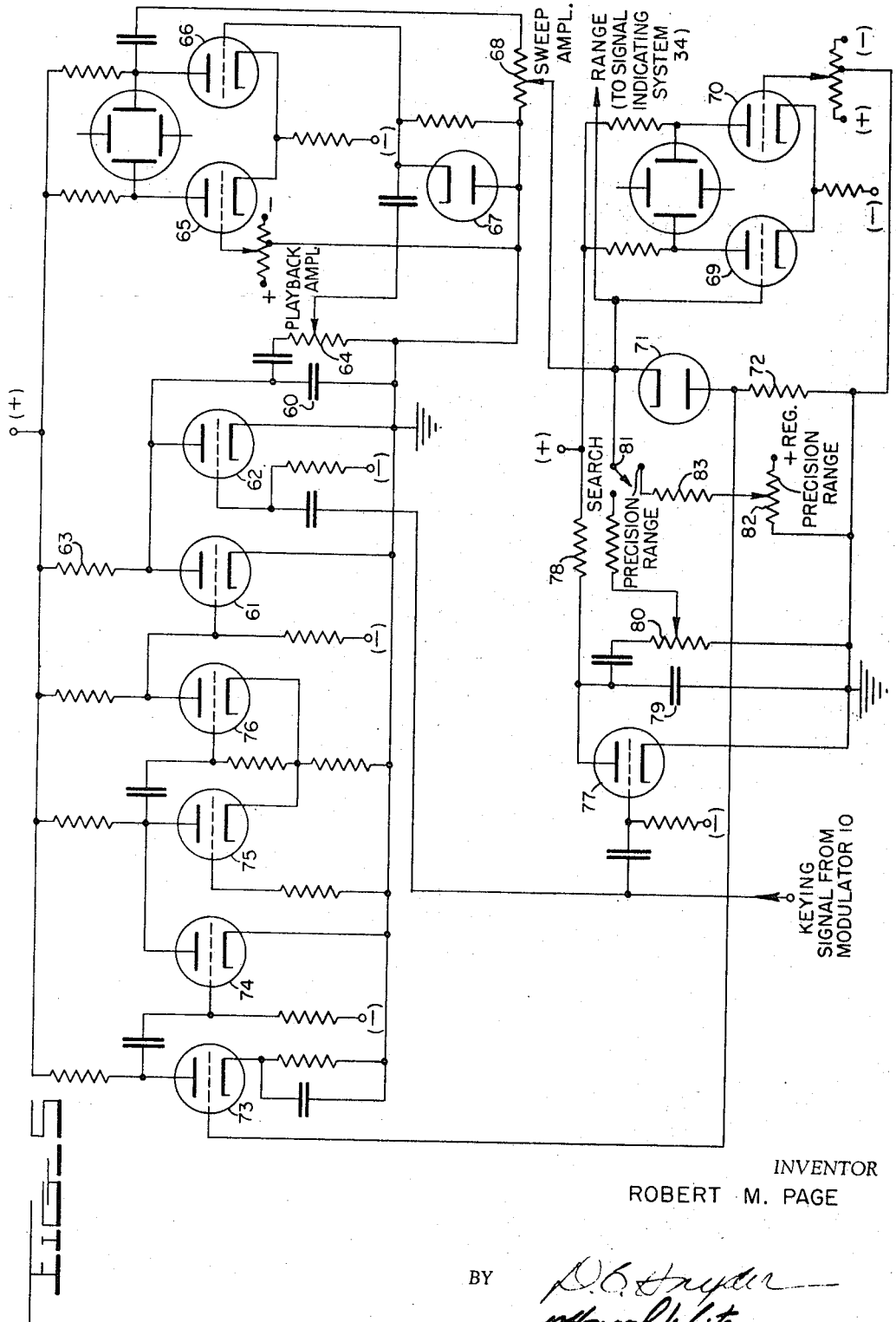

June 17, 1969
R. M. PAGE
3,451,059
ECHO RANGING SYSTEM OF VARIABLE SENSITIVITY AND
VARIABLE RANGE RESOLUTION
Filed June 8, 1950
Sheet 4 of 5
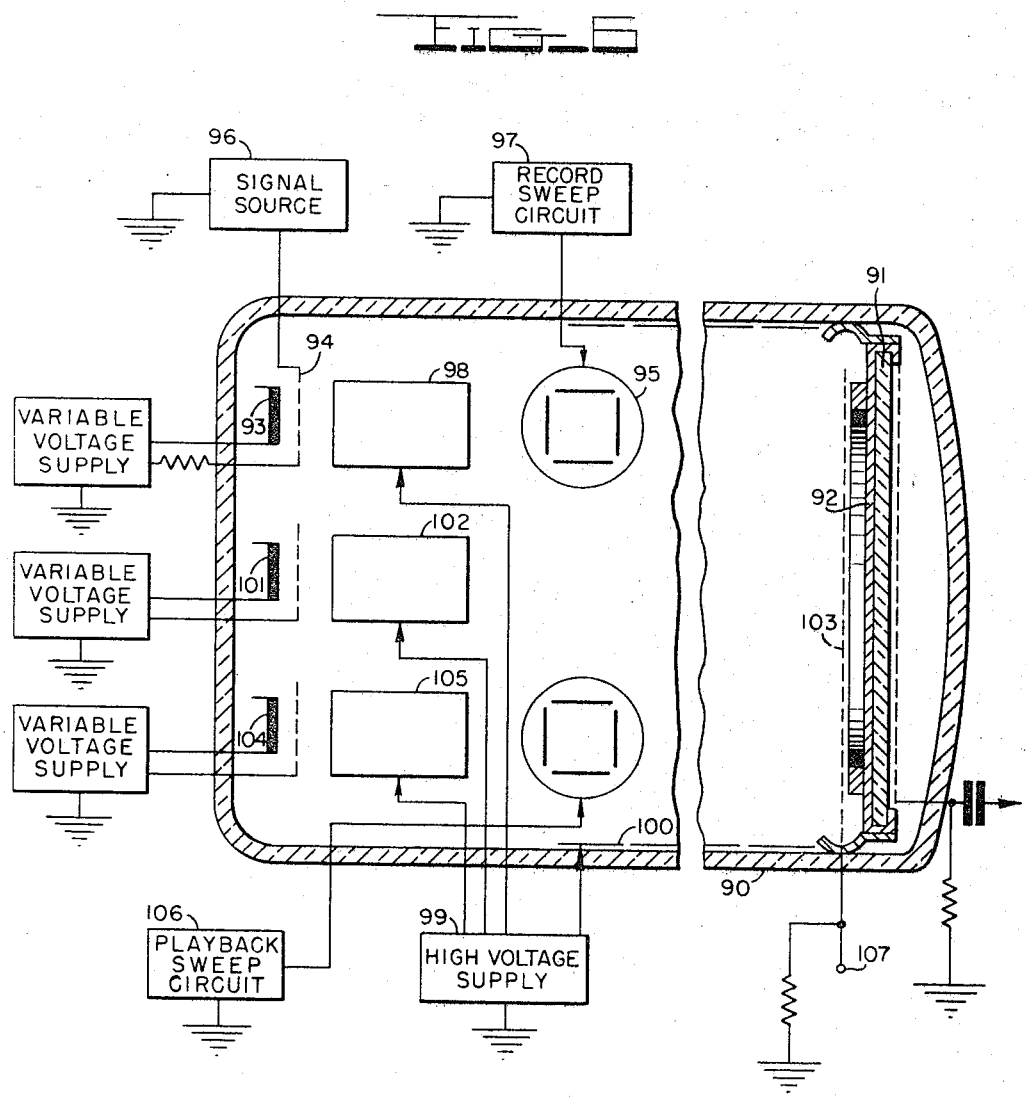
INVENTOR
ROBERT M. PAGE

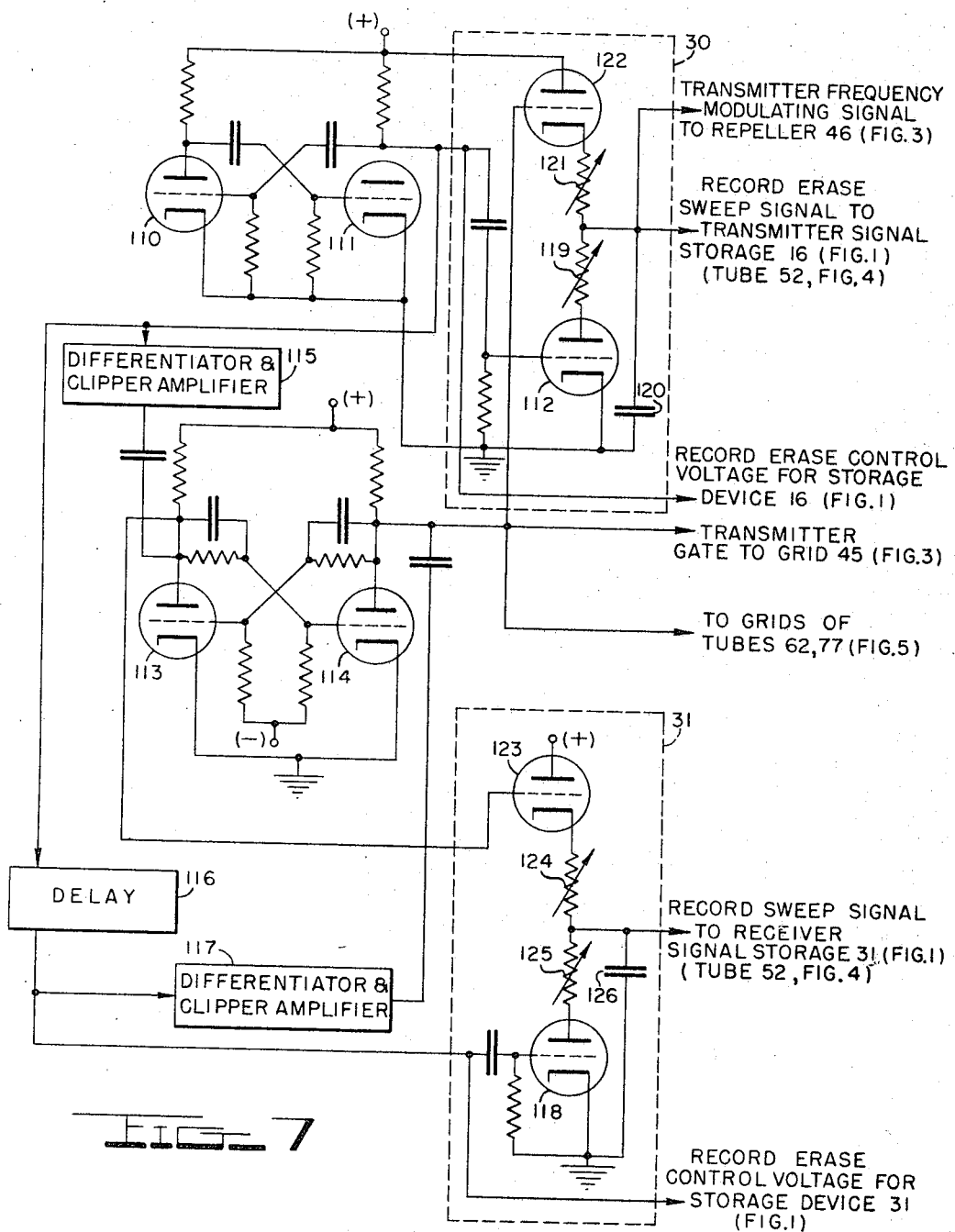

3,451,059
ECHO RANGING SYSTEM OF VARIABLE SENSITIVITY AND VARIABLE RANGE RESOLUTION
Robert M. Page, Camp Springs, Md.
(6672 Shay Lane, Paradise, Calif. 95969)
Filed June 8, 1950, Ser. No. 166,952
Int. Cl. G01s 9/06, 7/28
U.S. Cl. 343—13     9 Claims The invention described herein may be manufactured and used by or for the Government of the United States of America for governmental purposes without the payment of any royalties thereon or therefor.

This invention relates to pulse echo object locator systems in general and in particular to systems having both high range resolution and high sensitivity to facilitate the location of an object at long range and also to permit high resolution location of an object at close range with a high degree of accuracy.

Previously available pulse-echo locator systems such as those of the radar type employing electro-magnetic energy pulses in which the range of an energy reflective object is determined by measuring the time delay between the generation of a pulse of energy and the reception of echo energy by reflection from the object have suffered from many limitations. In general it is desirable to have a single locator system which can provide high sensitivity to permit the location of objects providing weak echo signals such as objects at long range or small objects, such as a submarine periscope, at intermediate ranges and also which is capable of such a high degree of range resolution as to provide data of sufficient accuracy to control gunfire. Such qualities as high sensitivity and high resolution have generally been impossible to obtain with a single system because they have exactly opposite basic requirements. For a given peak emitted power, one quality is generally improved at a sacrifice of the other. The consequence of this is that where physical limitations such as space, weight, cost, and power consumption are of no particular significance as on a battleship or aircraft carrier, separate fire control systems having high resolution are installed for gunfire control together with separate high sensitivity systems for long distance or early warning search. In many other installations where more consideration must be given to physical limitations only one system can be installed. A system for this installation would have to be either a fire control system or a search system to perform either job satisfactorily, however, if less accuracy and sensitivity is permissible, a single compromise system may be installed which can render fair performance for each.

The reasons why single conventional type systems cannot perform satisfactorily for both long distance search and close range fire control are many, however the basic limitations are imposed by the pulse characteristics. In general a long duration pulse permits high sensitivity at a sacrifice of range resolution and close range operation while a short duration pulse sacrifice sensitivity to provide high range resolution and close range operation. It might appear that a single radar system could easily be arranged to provide the two types of operation merely by altering the duration of the emitted pulses. Such could be done with a measure of success, however it is necessary to simultaneously vary the receiver bandwidth in keeping with the pulse width because a short duration pulse requires a wide bandwidth receiver to realize the range resolution contained in the narrow echo pulses, while long pulses require a narrow bandwidth receiver to provide noise rejection to improve signal-to-noise ratio. Such receiver bandwidth variation, particularly of the many bandwidth determining circuits in a radar receiver is not very practical. Even if provision were made to adjust transmitter pulse duration and receiver bandwidth, the system could not provide both high resolution and high sensitivity with each pulse emitted.

Since there exists a definite need for a locator system capable of providing both high sensitivity and high resolution and one which can operate at very close range, it is an object of the present invention to provide such a system.

Another object of the present invention is to provide a pulse-echo locator system which can operate at close range with long duration pulse signals.

Another object of the present invention is to provide a pulse-echo locator system providing high range resolution with long duration emitted pulse type signals.

Other and further objects and features of the present invention will become apparent upon a careful consideration of the following description and accompanying drawings in which, FIG. 1 shows in block form the features of the present invention.

FIG. 2 shows time relationships of signals involved in the apparatus of FIG. 1.

FIG. 3 shows in schematic form a typical arrangement of a modulator and transmitter employed in the apparatus of the present invention.

FIG. 5 shows in schematic form details of a playback sweep generator system.

FIG. 6 shows details of a typical signal storage tube.

FIG. 7 shows in schematic form a sweep generator circuit for providing transmitter modulation and record and erase sweeps for signal storage apparatus.

In accordance with the fundamental concepts of the present invention a high resolution, high sensitivity, pulse-echo locator system is provided in which generated pulses of high duty cycle are carrier frequency modulated. The modulation bandwidth employed is quite narrow during the first portion of each pulse becoming progressively wider as the pulse endures. Both the generated pulse and the echoes responsive thereto are stored at the carrier frequency generated or at a carrier frequency reduced therefrom if such is more convenient. The stored signals are reproduced in the reverse order to that recorded, that is, as reproduced, the trailing edge of generated pulses and echoes will occur first.

Time delay measurement for range determination is then made from the termination of a received echo to the termination of the pulse producing it and in this manner the "masking" of received signals from close range objects by long duration emitted pulses is avoided.

Intermediate frequency signals are obtained from the mixing of stored transmitter signals and stored received signals as described in my copending application Ser. No. 114,450, filed Sept. 7, 1949, now Patent No. 3,289,201, entitled "Radar System" to remove the frequency modulation on the signals and stabilize overall operation of the system.

Intermediate frequency signals thus obtained are subjected to integration as described in my copending application Ser. No. 135,215, filed Dec. 27, 1949, now Patent No. 3,274,594, entitled "Signal Integrating Radar System" to improve signal-to-noise ratio and improve sensitivity. Integration is thus made of short duration wide bandwidth signals when playback is limited to close range or of long duration, narrow bandwidth signals when playback is limited to long range.

The net result is the resolution-sensitivity characteristics which have previously been mentioned as desirable. To repeat, the resolution is maximum at close range, where it is needed for fire control, becoming progressivey poorer at longer ranges where it is of lesser importance. Also, the sensitivity is a minimum at close ranges, where it is not necessary because of the great strength of echo signals at close range, and increases with range to provide a maximum sensitivity at long range where it is needed because of the weak echo signals.

Figure 1:
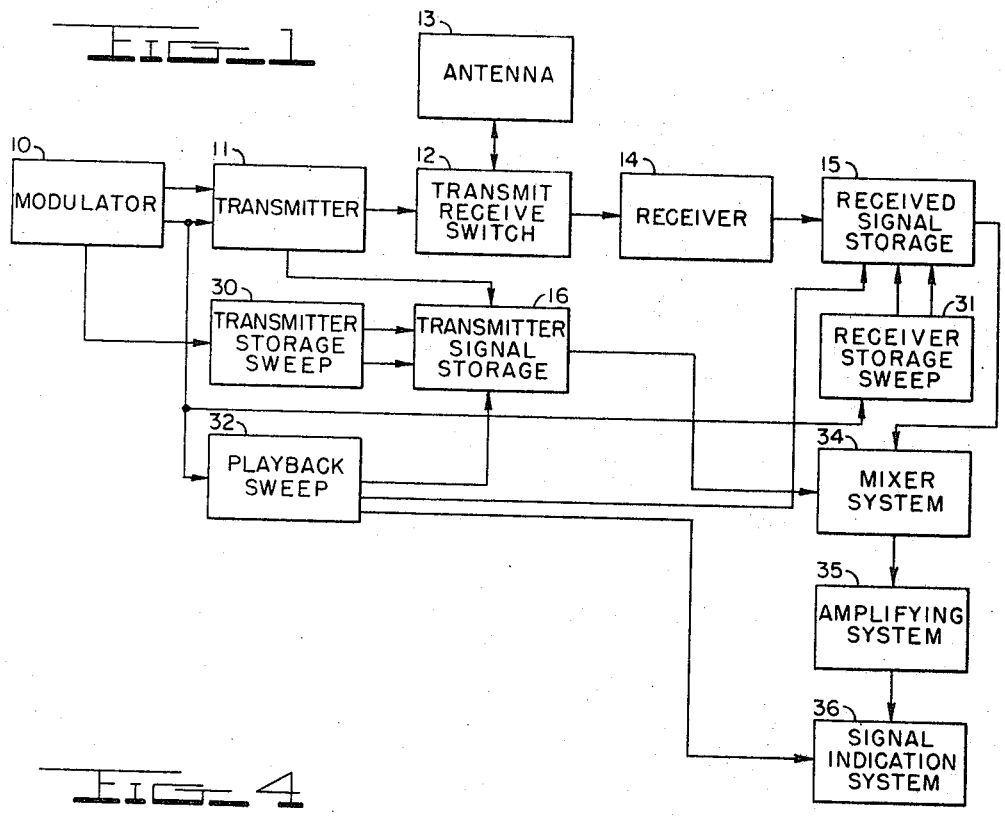

The general features of an object locator system constructed in accordance with the teachings of the present invention are exemplified by the block diagram of FIG. 1. In particular this system will be described with emphasis to radar applications, however it can provide substantial improvement is systems operative with propagational media other than electromagnetic waves. As an example, the principles are equally applicable to sonar systems.

In locator systems of the pulse-echo type such as radar systems, sensitivity to small objects and maximum range capability are dependent upon the average power of the emitted signal rather than the peak power of the pulsed system. This is true because short duration pulses require wide bandwidth amplifier circuits which are inherently responsive to random noise over a wide frequency range whereas long duration pulses can be handled by narrow band circuits which are responsive to random noise over only a narrow frequency range. Thus even though short duration pulses may employ high peak power, they are no more effective against random noise than are longer pulses of lower peak power provided the average power of the two conditions is the same.

The use of long duration pulses has been quite limited in the past because of the necessity for range resolution. Long duration pulses necessarily "blanket" a greater range interval than short pulses so that with long duration pulses it is imposible to distinguish between two objects which are close together or to respond to close range objects because the echo signals are obscured in greater or lesser degree by the transmitter pulse itself. Thus it is not uncommon to see radar sets employing pulses of a duration of one microsecond or less, having tremendously high peak powers, merely to secure high resolution.

Such high peak powers in radar systems are obtained with very low average powers, a typical system providing 40 yards resolution capabilities employing ¼ microsecond pulses of 50 kw. peak power at a duty factor of only $5 \times 10^{-4}$. This corresponds to an average power of only 25 watts. To develop such high peak powers requires electron tube devices with tremendous emissive characteristics, heavy filaments, high filament power and rugged construction not to mention the tremendous modulator requirements necessary to turn on and off such peak powers. Additionally such high powers are accompanied by high radio frequency voltages which introduce serious insulation difficulties on the transmission lines of necessity employed.

With a system employing 50 percent duty cycle, the peak power is only double the average power, hence in the above illustration the same sensitivity could be obtained with an average power of only 50 watts. Such low peak powers are much easier to obtain and to deliver through transmission lines than the 50 kw. mentioned above yet the system sensitivity in the face of random noise is the same.

In FIG. 1, to which reference is now made, the modulator 10 controls the overall operation of the system directly providing first a substantially square wave signal to key the transmitter 11 to produce the pulses of radio frequency energy at approximately 50% duty cycle. Additionally the modulator 10 produces a frequency varying oscillation suitable for frequency modulating the transmitter 11 during each pulse generation period. The frequency varying oscillation starts from a low frequency at the start of the transmitter pulse, gradually increasing in frequency to reach a maximum relatively high frequency at the end of each transmitter pulse. For these two signals, two connecting lines are shown leading from the modulator 10 to the transmitter 11. The design of these two components is not particularly critical, more exemplary details being indicated in FIG. 3 which will be described later. For ease in developing simultaneously controlled amplitude and frequency modulation, a transmitter 11 which is of the reflex klystron type with a control grid and a repeller electrode possesses distinct advantages. Simply by varying the grid potential it is possible to turn the pulses on and off while a variation of the repeller voltage can obtain the frequency variation of bandwidth modulation desired.

Energy pulses generated by the transmitter 11 are applied through the transmit-receive switch 12 to the antenna 13. Both of these latter two devices may be of conventional radar structure, however full advantages of the lower peak power may be taken in their design, as well as in the design of transmission lines interconnecting them. As is customary radar practice, the transmit-receive switch 12 operates to connect the antenna alternately to the transmitter 11 in periods of signal generation thereby and to a receiver 14 in other periods to prevent damaging or desensitizing the receiver by the direct transmitter energy and to prevent loss of return energy in the transmitter and lines leading thereto. In general the switch 12 employs at least one ionizable chamber however in certain cases it may be preferable to employ simply a mechanical switch.

Return signals obtained by reflection or reradiation from distant objects as intercepted by an antenna 13, which is generally uni-directional, are applied through the switch 12 to be amplified in receiver 14 and then stored as carrier waves, that is, before demodulation, in received signal storage device 15. For this storage of radar signals the storage device 15 preferably includes an electronic "memory" tube such as that described in the copending application of A. V. Haeff, Ser. No. 768,790, filed Oct. 15, 1947, now patent No. 2,813,998, entitled, "Method of Storing, Maintaining and Reproducing Electrical Signals and Means Therefor," wherein signals are stored as electron concentration variations on a collector plate and obtained in playback by secondary emission currents therefrom. The exact storage device is of no particular signficance except that it must be capable of handling the receiver output signals. Since signal storage has definite frequency limitations it is usually desirable that the signals to be stored be of as low frequency as possible. Accordingly the receiver 14 will usually contain a frequency converter operative to reduce the received signal frequency to a lower frequency as is conventional superheterodyne practice. In many instances, however, particularly where the transmitter 11 operates at low frequencies which are capable of being handled by the storage device 15, the receiver 14 may be a cascade of suitable radio frequency amplifier stages. Receiver 14 and storage device 15 must possess adequate bandwidth to accommodate the spectrum due to pulse width as well as the spectrum introduced by frequency modulation and any shift due to Doppler introduced by relative motion between the locator system and energy reflective objects.

The relatively wide bandwidth of these circuits does not provide a high degree of rejection of random noise, however, the signal bandwidth may be reduced by beating the stored received signals with the transmitter signals producing them. By this operation frequency variations of the transmitter signal are wiped out as described in detail in my copending application Ser. No. 155,773, filed Apr. 13, 1950, now Patent No. 3,274,595, entitled "Locator System."

This beating of received signals with the transmitter signals is obtained by recording the transmitter signals in transmitter signal storage device 16 as generated and then playing back the recorded transmitter signals and received signals simultaneously to obtain beat frequency signals of substantially a constant frequency which are then utilized by some form of indicator. The receiver signals and transmitter signals are reproduced in correspondence, that is in simultaneous playback, the portion of the transmitter pulse producing echo signals from an object from a particular range are played back at the same time as the received signals. Playback is in an inverse direction to that recorded and the playback is such that playback of the trailing end of *received* pulses (for a selected range) starts at the same instant as the playback of the trailing end of the transmitter pulse producing it.

The text of the foregoing paragraph is of utmost importance in appreciating the full import of the present invention and is worthy of the closest consideration. It may be explained further with the assistance of FIG. 2 which shows various recorded signals on an elapsed time basis.

In FIG. 2, waveform A represents the frequency modulation waveform of the signals produced by the transmitter 11 and retained in part by the transmitter signal storage device 16. On this waveform it will be noted that the pulse duration as well as the pulse spacings are made equal representative of a 50% duty cycle.

Waveform B shows received signals returned by an object at close range. Transit time produces a pulse delay by the amount of time 17 so that return energy from the leading edge of the transmitted pulse will appear delayed with respect to the transmitter pulse. The return signals received from that time until the termination 18 of the transmitter pulse 18 are masked by the transmitter pulse and hence are of no particular value. The only portion of the received signal which is of use is that occurring after the transmitter pulse in the interval 19. The received signals of this interval 19 correspond to the last portion 20 of each transmitted pulse. The three intervals 17, 19 and 20 are all of equal duration.

Recording of signals is in a left to right direction while playback is the opposite, from right to left. Playback of transmitted and received signals of the intervals 20 and 19, respectively, is simultaneous, starting from the lead lines 21 and 22 and progressing to the lead lines 23 and 24. The playback is repetitive, that is, each time the lines 23 and 24 are reached, rapid flyback occurs to again scan the intervals 19 and 20. Playback transmitted and received signals are mixed together and since they are of substantially the same frequency, a low frequency beat note is ordinarily obtained which becomes the output signal. High range resolution is possible for objects at close range because of the wide bandwidth of the signals in this region. Thus low frequency beat signals are obtained only when the playback interval is exactly in time coincidence with the over-extending received interval 19.

Where an energy return object is located at long range, the period of time in which the transmitter and receiver pulses overlap is less than in the situation just described so that a longer received signal period is stored. Such a situation is shown by waveform C in FIG. 2 where the received signal interval stored is represented by numeral 25 corresponding to the transmitter signal portion 25-A of waveform A. In the interval 25 the low frequency modulation portion of the emitted signal comes into service to minimize cumulative phase shifts due to Doppler or other change of the stored signals on playback so that the beat frequency in playback does not become too great toward the end of each playback signal.

As a practical matter all signals from a plurality of objects closely spaced are separated by the frequency modulation of the signals because only when playback starts at exactly the end of a received pulse will frequency correspondence be maintained throughout the received signal.

To cover the entire range interval in search operations, a range sweep is employed in which the playback starts immediately after the termination of each transmitter pulse to scan the close ranges such as the interval 19 and gradually progresses, delayed by greater and greater amounts to scan the longer interval 25 and beyond. This scan and progression is obtained by two separate sweep circuits sweeping in opposing direction. The scan sweeps start with a selected time delay following the termination of each transmitter pulse and scan in an inverse time proportion to scan the stored transmitter and received signals from right to left in FIG. 2. This selected time delay (progression) is varied in a direct time proportion to increase the time interval in each scan by progressively greater amounts. The progression signals increase substantially linearly with time, in an amount as nearly proportional to pulse-echo time delay as possible, so that the scanning interval is always just a slight amount longer than the duration of the received signals following the termination of a transmitter pulse. To permit this time arrangement, the transmitter duty cycle is of course limited to something less than 50%. Actually it could be made quite close to 50% to secure as high a sensitivity as possible.

Referring again to FIG. 1, storage of transmitter and receiver signals in the storage devices 16 and 15 is under the control of the transmitter storage sweep generator 30 and receiver storage sweep generator 31. These sweep generators are preferably sawtooth wave generators providing very linear sawtooth signals which may be applied to the storage devices 15 and 16. The sweep generators 30 and 31 are controlled from the modulator 10 and of necessity are alternately operated because of the alternate character of the transmitter and receiver signals.

Playback or reproduction of the stored signals is under control of the playback sweep generator 32. The sweep generator is controlled from the modulator 10 and the generated sweep signals are applied to the storage devices 16 and 15. As with the other sweep generators 30 and 31 it is desirable that the sweep waveforms be as linear as possible.

The previously referred to mixing of the playback receiver and playback transmitter signals is provided by mixer system 34 to obtain a beat frequency output signal of narrow bandwidth which is amplified in a narrow band amplifying system 35 for presentation by the signal indication system 36. Considerable leeway is possible in the selection of these last three components, choice being made to secure the most out of the received signals in the simplest manner.

If the transmitter and receiver signals are stored and played back by identical signals, the normal result would be playback transmitter and receiver signals that are practically identical in frequency. Such would result in the production of practically no beat signal by the mixer system 34. This situation can be readily prevented by a purposeful variation of the frequency of one of the playback signals by a selected amount. Such variation can be introduced by adjusting one of the sweep circuits so that one of the sweep rates (playback or record) for one storage device is different from the corresponding sweep rate for the other storage device. Alternately this frequency shift of one of the signals may be realized by the operation of a separate oscillator and mixer in the mixer system 34. In such a situation the oscillator could conveniently be operative at the center frequency of a narrow frequency band to which the amplifying system 35 is responsive or at a frequency bearing some harmonic relationship thereto.

The frequency band output from amplifying system 35 may be presented directly by the signal indicating system 36 as with a cathode ray tube indicator. If the frequency of this signal is high it may be more desirable to include a detector in the amplifying system 35 so that the indicating system 36 is supplied with a rectified envelope signal.

Figure 4:
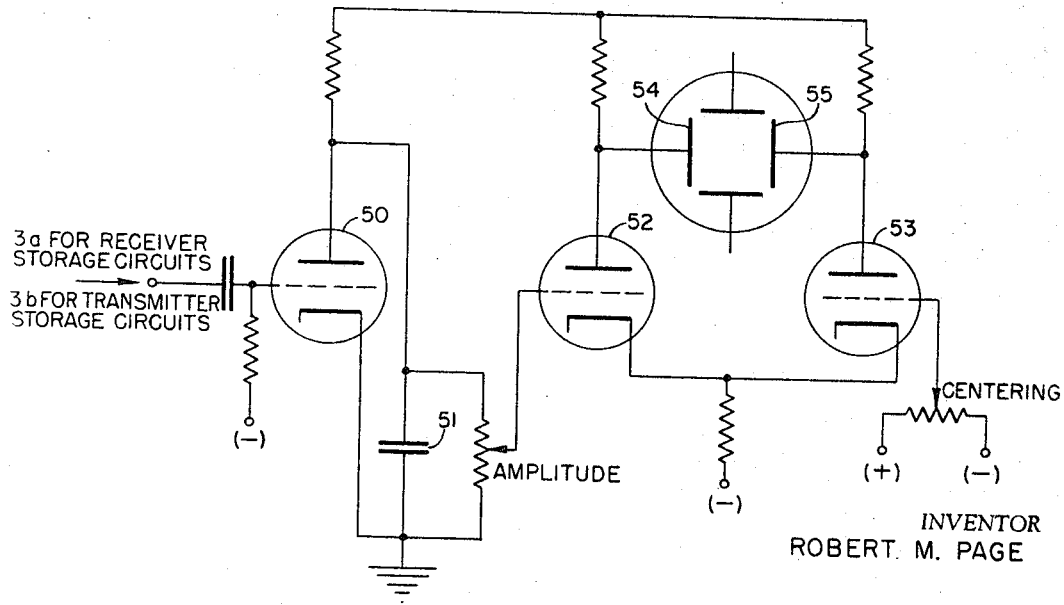
FIG. 4 shows in schematic form details of a typical storage sweep generator and deflection amplifier circuit.

Schematic diagrams of exemplary sweep generators 30, 31, and 32 have been given in FIGS. 4 and 5 to show the general requirements for these circuits. It is to be understood that these sweep circuits of FIGS. 4 and 5 as well as the modulator and transmitter circuit given as a schematic diagram in FIG. 3 are exemplary only to indicate the genral scheme of things and are not to be interpreted as being the best, the preferred, the simplest or the most accurate circuits known.

Since the entire circuit is synchronized and controlled by the modulator circuit, the schematic diagram of FIG. 3 showing the modulator as well as the transmitter will be described first. The modulator, enclosed within the block 10, includes a repetition frequency establishing multivibrator circuit of electron tubes 40, 41. This multivibrator circuit, as may be seen from the connections thereof, is of the free running type operative at a frequency established primarily by the time constants of the grid circuits of the tubes. Pulse duration timing as well as pulse repetition frequency timing is provided by this multivibrator circuit. With a 50% duty cycle, the circuits would be balanced, providing practically square waveforms at the anodes of the tubes. Actually in the circuit as previously described where the duty cycle is slightly less than 50%, the multivibrator circuit constants will be proportioned to where tube 41 is cut-off a greater percentage of the time than tube 40.

Tube 41 drives tubes 42 and 43 to control the reflex klystron transmitter tube 44 in the production of frequency modulated pulses of radio frequency energy. Tube 42 operates as an inverter-driver tube to "pulse" the grid 45 of tube 44 to periodically unblock that tube permitting the production of radio frequency energy. In a reflex-klystron tube, oscillation frequency is determined in part by the voltage on the repeller electrode 46. Advantage of this characteristic to produce the frequency variations of the radio frequency energy previously described is taken by applying a sawtooth varying signal to the repeller electrode. This sawtooth signal is obtained from the sawtooth generator of which tube 43 is a part.

During the time interval when grid 45 is unblocked, tube 42 is non-conductive, as is tube 43. With tube 43 cut off, capacitance 47 is allowed to charge through resistance 48 producing thereby a substantially linearly rising voltage. When tubes 42 and 43 are returned to conduction by tube 41, tube 43 operates as a low impedance placed across capacitance 47 to effect the rapid discharge thereof to make ready for the production of another sawtooth signal.

Modulated radio frequency energy is obtained conventionally at the output terminal 49.

Details of the storage sweep circuits are shown by FIG. 4. Actually the two circuits 30 and 31 may be practically identical so one showing will suffice for both, it being understood that two such circuits are required in the complete system. The circuit of FIG. 4 is a slave circuit, controlled in operation by the modulator circuits of FIG. 3. Basically the circuits of FIG. 4 include a sawtooth generator of tube 50 similar to that of tube 43 in the circuit just described, and a suitable deflection amplification system of tubes 52 and 53 applying the sawtooth signals to the deflection control means of the signal storage device.

In the sweep circuit 30 for transmitter signal storage the electron tube 50 of the sawtooth generator receives the signal from the anode of tube 41 (FIG. 3) producing a sawtooth signal across capacitance 51 which is amplified by the push-pull cathode coupled deflection amplifier tubes 52–53. The output of the deflection amplifier tubes is coupled to the deflection means of the signal storage device, indicated generally by the deflection plates 54, 55.

The sweep circuit 31 for the storage of received signals differs from that just described only in the source of control signals. Instead of receiving its control signal from the anode of tube 41 it receives the control signal from the anode of tube 40. Thus each received signal storage sweep will commence immediately following the termination of each transmitted signal storage sweep.

At this point it may be noted that the sweep generator circuit of tube 50 for the transmitter storage sweep 30 is actually a duplicate of the sweep generator circuit of tube 43 in the modulator 10 (FIG. 3). With such an arrangement in many instances it may therefore be possible to omit the sawtooth generator of tube 50 in the transmitter storage sweep 30 and drive the deflection amplifiers 52 and 53 (transmitter record sweep circuit) from the anode of tube 43 effecting a saving of one tube.

With reference now to FIG. 5, both the transmitter signal storage device 16 and the receiver signal storage device 15 of FIG. 1 employ the same basic playback sweep signal which is produced across the capacitance 60 by variations in the conductivity conditions of tube 61. Capacitance 60 is connected to the anodes of tubes 61 and 62 and also to a positive supply through a resistance 63. Starting the description and discussion of the overall circuit operation at this point, a situation may be considered in which the sweep suppression tube 62 is nonconductive and tube 61 has just been cut off. At this instant capacitance 60 begins an exponential, substantially linear, charge through resistance 63 producing a rising voltage signal. This signal is applied through the playback amplitude control 64 to push-pull cathode coupled deflection amplifier 65, 66 which controls the playback scan of the stored transmitter signal. To insure that the playback scanning of the transmitter signal always starts from a selected point which is the termination of the transmitter pulse, the grid of tube 66 is "clamped" at a maximum negative potential equal to ground potential by a diode electron tube 67.

The playback sweep produced at the anode of tube 66 and which is inverted with respect to that produced across capacitance 60 is applied through an amplitude control potentiometer 68 to the grid of tube 69. Tube 69, together with tube 70, provides another balanced, cathode coupled amplifier system which provides deflection signals of the playback of the stored received signals.

Received signal playback requires a scanning signal which always terminates at a selected maximum point equal in effect to the termination of the transmitter pulse. This fixed termination is provided by a second diode clamping tube 71 which for all practical purposes prevents the grid of tube 69 from falling below ground potential. With this circuit arrangement, each time the varying playback potential lowers the grid of tube 69 a small amount below ground potential, clamper tube 71 conducts providing a negative signal across a small signal developing resistance 72 connected between the anode thereof and ground potential. Resistance 72 is made of a small value so that its presence has negligible interference with the effectiveness of the clamping action of tube 71. The negative signal produced across resistance 72 occurs at the peak of the playback sweep signal and hence indicates that on an inverse time basis the received signals have been played back to the termination of the transmitter signal.

The negative signal thus produced across resistance 72 is applied to a two stage amplifier of the tubes 73, 74 to bring tube 74 to momentary conduction. Tube 74 is a keying tube for a one-shot multivibrator circuit of tubes 75, 76, which by means of the discharge tube 61, discharges capacitance 60 to make ready for another sweep cycle. Such cyclic operation continues repeatedly as long as tube 62 is maintained non-conductive by the signal from the modulator which is the entire receiving period.

The amplitude of the repetitive sweep signals (range selection) is varied continuously by the operation of another sawtooth generator circuit including the discharge tube 77, resistance 78 and capacitance 79. By virtue of the connection of the grid of tube 77 to the anode of tube 40 (FIG. 3) tube 77 is held conductive during each transmitter pulse so that a low, substantially constant, potential is maintained across capacitance 79. At the conclusion of the transmitter pulse, however, tube 77 is cutoff permitting the capacitance 79 to charge through resistance 78 producing a rising sawtooth waveform. This signal is applied to the grid of tube 69 through potentiometer 80 and switch 81 to raise the average potential thereof so that as time progresses a larger and larger amplitude sweep signal is required to produce conduction by tube 71 on the negative peaks. By this means therefore the duration and amplitude of the sweeping voltages developed across capacitance 60 and applied to the transmitter and receiver signal storage devices as playback scanning signals is gradually increased as time passes following each transmitter pulse. Despite this amplitude variation the prearranged limits set up by the clamper tubes 67 and 71 are maintained so that the transmitter playback sweeps always *start* their inverse time operation at a fixed level which is clamped to the end of the transmitter pulses as stored and the received signal playback sweeps are always *terminated* at another fixed level also clamped to the termination of the transmitter pulse. This statement may be explained more fully by reference again to FIG. 2. The level set by the transmitter signal clamper 67 is that represented by line 21 of waveform A so that transmitter playback scans always start therefrom and proceed to the left toward line 23. The second level as set by the clamper 71 on waveform B is represented by the line 24. Since this line represents the termination of generated transmitter pulses, receiver signal scans must start a constantly varying amount to the right of this line 24, for example at the line 22 and also scan to the left. In this manner the close range signals received in the typical interval 19 will be played back in coincidence with a corresponding time duration interval 20 of the transmitter signal. At a later instant of time after signals have been received from a long range target as represented by waveform C, the scanning interval will have increased to cover the portions 25 and 25-A.

Since the amplitude of the sweep signals is a direct criterion of the range to which the response of the system is concentrated, it is possible with the apparatus of FIG. 5 to measure this amplitude with precision to determine accurately the range of a reflective object. Such measurement is permitted by a second position of switch 81 wherein a D-C potential is supplied from a regulated voltage supply by means of a tap on precision range potentiometer 82 through a signal developing resistor 83. Thus by operating switch 81 to the lower position, the range search signal from potentiometer 80 is no longer applied to the tube 69 but in its place, a D-C voltage of a value selectable with great accuracy by potentiometer 82. Potentiometer 82 is calibrated in range so that the object range providing an output signal on the indication system 36 of FIG. 1 can be determined accurately. In the normal course of operation therefore it would be customary to place switch 81 in the search position applying the range sweep signals to tube 69. When an energy reflecting object has been detected in this manner, switch 81 is moved to the lower position so that an accurate range reading may be made. To facilitate this operation it is desirable that the signal indication system 36 of FIG. 1 include some form of range indication.

It should be noted at this point that the stored received signals have been shown in FIG. 2 in a noise free condition with energy return occurring from only one object in either case. The presence of noise and also of signals from objects at different ranges on the received signal storage device will add some interference to the signal from a particular range, however the mixing action of the frequency modulated transmitter signal with the receiver signal from the particular range under scrutiny at each scan will prevent response to the interference.

The aspects of signal storage have been mentioned only briefly thus far, however, the Haeff application has been referred to previously and the storage tube thereof can be described in considerable detail in conjunction with FIG. 6 to which attention is now directed.

In the apparatus shown in FIG. 6 an evacuated envelope 90 is provided enclosing electron tube elements. The tube has an insulator plate 91 with an active surface 92 placed thereon. Typically the plate may be of glass and the active surface distributed willomite particles.

An initial charge distribution pattern representative of the transmitter pulse may be placed on the active surface 92 by an electron gun including cathode 93. The beam of this gun may be controlled by grid 94 and the deflection means 95 under intensity control of signals supplied from signal source 96 and deflection signals from record sweep circuit 97. Signal source 96 in the case of signal storage device 16 of FIG. 1, for example, may correspond to the transmitter 11 or to receiver 14 for the received signal storage device 15. The beam is focused by a conventional lens electrode system shown diagrammatically at 98 for which a voltage supply 99 is provided. The main tube anode 100 coated on the interior of the envelope is also energized by supply 99.

Signals placed on the active surface 92 are maintained thereon for considerable periods of time if so desired by delivering low velocity electrons thereto from an electron gun assembly including the cathode 101 and focusing lens system 102.

Screen 103 possessing close spacing such as 200 mesh per inch collects secondary electrons emitted from the surface 92 upon bombardment by playback scanning electrons from a playback electron gun including cathode 104 and focusing lens system 105. This playback scan is controlled by the playback sweep circuit 106.

Output signals produced from the secondary emission current to screen 103 are obtained at terminal 107 and represent, for example, the output signals delivered from the storage devices 16 and 15 of FIG. 1 to mixer system 34.

Erasure of signals retained by the storage devices can be accomplished in one way merely by terminating the holding beam from cathode 101, however, such erasure is rather slow depending upon a gradual dissipation of the stored signals. Such slow speed erasure is in general inadequate for the requirements of the present invention so that additional provision for erasure must be made.

The entire proposition of signal storage and erasure depends upon obtaining equilibrium or balanced conditions between primary electrons reaching and secondary electrons leaving the screen 103 of the storage tube. By altering the tube potentials it is possible to alter the equilibrium so that the screen loses or gains electrons as it is scanned by the record beam. Thus electron concentration conditions set-up by one scanning at one beam condition may be "wiped-out" or erased by a subsequent scan at different beam conditions. The speed of erasure depends upon beam current because a specific quantity of electrons is required to alter previous stored conditions. It is therefore essential to employ adequate beam current during erasure. Since the period of erasure must be deducted from the total time available for integration of stored signals, it is highly desirable that erasure be accomplished as quickly as possible. Thus it is desirable to increase beam current during erasure for more effective operation.

Erasure in a three-gun tube of the type discussed thus far can be accomplished by either the "record" or the "playback" beam, however in the particular system, it is generally preferable to employ the "record" beam for erasure as well, on a time sharing basis, in both the transmitter storage and receiver storage devices. Thus it is necessary to alter the beam potentials between cathode and screen in the record gun as operation is changed from "record" to "erase" and simultaneously change the grid biasing voltage between control grid and cathode to permit a heavier beam current to flow in the "erase" phase of operation.

To indicate the requirements for a typical rapid erasure circuit, the modulator 10, transmitter storage sweep 30 and receiver storage sweep 31 of FIG. 1 have been repeated in a second schematic form in FIG. 7.

In FIG. 7, the transmitter storage sweep 30 of FIG. 1 is enclosed within the dotted block 30 while the receiver storage sweep 31 of FIG. 1 is enclosed within the dotted block 31. The balance of the showing of FIG. 7 is properly classified as comprising the modulator 10. Several slight differences exist between the interconnections of the blocks of FIG. 7 and those of FIG. 1, however in principle there are no significant differences. FIG. 1 shows a single connection between modulator 10 and transmitter storage sweep 30 and another single connection between modulator 10 and receiver storage sweep 31. Actually in FIG. 7, two separate connections are shown at each point. In FIG. 1, the transmitter 11 is shown receiving its frequency modulation signal direct from modulator 10 whereas in FIG. 7 the signal is obtained from the transmitter storage sweep 30 instead. These differences are minor and are shown more for convenience than any other reason, eliminating the requirement of a separate sawtooth signal generator in the modulator 10 to provide the transmitter frequency modulating signal.

The modulator of FIG. 7 contains a free running timing circuit of the tubes 110–111 which establishes the repetition rate of the radar system. The circuit is shown as a free running multivibrator and in design, the circuit constants are selected to provide very unsymmetrical operation providing short duration positive pulses at the anode of tube 111.

The anode of tube 111 is connected to a number of points in the overall circuit. A first connection is to the grid of tube 112 in the transmitter storage sweep circuit 30. Additional connections are made to a switch circuit of tubes 113–114 through the differentiator and clipper amplifier 115 and through delay circuit 116 and the differentiator and clipper-amplifier 117. Still another connection is through the delay circuit 116 to the grid of tube 118 in the receiver storage sweep circuit 31. The final connections of the anode of tube 111 are made to the storage devices 16 and 15 through the sweep circuits 30 and 31 to control the electrode voltages in the electron guns of the storage devices as operation is altered between record and erase.

The switch circuit of tubes 113, 114 is of the Eccles Jordan type possessing two stable states. The stable state wherein tube 113 is conductive is established by a negative pulse applied to the anode of tube 113, occurring at the conclusion of the short duration positive pulse produced at the anode of tube 111. This synchronism is maintained by differentiating the positive pulse produced at the anode of tube 111 to obtain alternate positive and negative pulses, then selectively amplifying only the negative differentiated pulses. Such action is provided by the circuit within block 115.

The stable state of the switch circuit wherein tube 114 is conductive is brought about at a subsequent instant of time established by the delay circuit 116. Delay circuit 116 produces positive pulses delayed with respect to the pulses of the anode of tube 111 by a selected amount. The delayed signals are differentiated and selectively amplified to supply delayed negative pulses to the anode of tube 114. In the previous discussion much mention has been made of the 50% duty cycle. This duty cycle, or any other for that matter, is brought about by adjusting the delay circuit 116 to where the delay introduced thereby is proper to obtain equal "on" and "off" times for the tubes 113, 114.

Transmitter storage sweep circuit 30 contains the previously mentioned tube 112, the anode of which is connected to ground through resistance 119 and capacitance 120 to a positive voltage supply through resistance 121 and electron tube 122. Tube 112 is gated by the positive signal produced at the anode of tube 111 and is conductive to discharge capacitance 120 only during the short period of non-conduction in tube 111. This discharge may be prolonged to occupy the entire period by adjustment of the resistance 119.

At the conclusion of the positive pulse at the anode of tube 111, the switch tube 114 is cut off thereby raising the potential at the grid of tube 122 to permit charging of capacitance 120 through resistance 121. This charging is exponential and may be controlled in amplitude by adjusting resistance 121. As tube 114 is returned to conduction by the delayed peaked signal from circuit 117, tube 122 is cut-off preventing further charging of capacitance 120. Capacitance 120 thereafter remains in a partially charged condition until a subsequent positive pulse is produced at the anode of tube 111. Thus is produced a repetitive sawtooth waveform across capacitance 120 which has a high voltage level or "plateau," a rapidly falling portion, and a slowly rising portion. Only during the slowly rising portion of the repetitive signal is the transmitter 11 unblocked at its grid 45 (FIG. 3) to produce output radio frequency energy.

This period represented by the non-conductive condition in tube 114 represents the transmit period and the time in which transmitter signals must be recorded in the forward or "record" sweep of transmitter signal storage device 16. Thus the signal across capacitance 120 is applied as a deflection signal to the record-erase gun of storage device 16. The rapidly falling flyback portion represents the "erase" time for the transmitter signal storage device, hence in this period, the transmitter gun potentials must be adjusted to those providing erasure of the stored signals. Such gun potential adjustment is provided by the connection as indicated to the anode of tube 111.

Record and erase sweep signals for the receiver signal storage device 15 are obtained in very much the same manner through the operation of sweep 31. The circuit 31 employs the two switch tubes 118 and 123 wherein the anode of tube 123 is connected to (B+) and the cathode thereof to the anode of tube 118 through resistances 124 and 125. The cathode of tube 118 is grounded. A capacitance 126 is connected between the junction of resistances 124 and 125 and ground. By virtue of this connection, capacitance 126 charges toward (B+) through resistance 124 and tube 123, when tube 123 is conductive, then subsequently discharges through resistance 125 and tube 118 when tube 118 is conductive.

Tube 123 is brought to conduction at the conclusion of the transmitter pulse when tube 113 is cut off. Thus a forward "record" sweep stops when tube 123 is cut off at the beginning of a subsequent transmitter pulse. Capacitance 126 thereafter retains its charge until immediately prior to the end of the transmitter pulse at which time the delayed pulse from circuit 116 brings tube 118 to conduction to rapidly discharge capacitance 126 providing the flyback. In the flyback time, the delayed pulse from circuit 116 is applied to the receiver signal storage device 15 to alter the gun potentials to those required for erasure. Such application is made through suitable amplifier or coupling stages not shown. The durations of "record" time and "erase" time depend upon the time constant circuits controlled by the switch tubes 118 and 123. The time constants of the circuits involving capacitance 126 are adjusted by varying resistances 124 and 125 so that the voltages produced are as near linear as possible.

The broad features of the invention have thus been discussed together with exemplary circuits of general types suitable for use in the overall apparatus.

From the foregoing discussion of the present invention it is obvious that considerable modification of the features thereof is possible without exceeding the scope thereof as defined by the appended claims.

What is claimed is:

1. A pulse echo object locator system comprising, means periodically transmitting pulses of carrier frequency energy having a time spacing substantially equal to the duration of the pulses, the carrier frequency of each pulse varying continuously from a low frequency value at one end of the pulse to a high frequency value at the other end of the pulse over the duration of the pulse, a receiver for receiving energy reflections of said pulses, a storage means for recording the carrier frequency characteristics of the transmitted and received pulses, means simultaneously reproducing similar portions of the stored transmitted and received pulses backwards, and means mixing the reproduced signals to obtain a useful beat frequency signal.

2. A pulse-echo object locator system, comprising, means generating pulses of carrier frequency energy at a duty cycle of substantially fifty percent, each of said pulses having narrow bandwidth frequency modulation at the start thereof progressing to a wider bandwidth frequency modulation at the termination thereof, storage means retaining generated pulse signals and echo pulse signals, means connected to the storage means simultaneously reproducing the stored generated and echo signals in inverse time order synchronizing the start of each reproduction at the termination of the stored generated and echo signals, mixing means combining the reproduced stored signals to obtain beat signals, and means connected to the output of the mixing means utilizing the beat signals.

3. A pulse-echo object locator system wherein objects are located by intercepting radiant energy reflected therefrom and measuring the time delay in energy transmission comprising, a carrier frequency energy generator, a modulator connected to said generator to provide simultaneous amplitude modulation and bandwidth variation thereof in pulses of substantially fifty percent duty cycle having a narrow bandwidth frequency modulation at the beginning progressing with time to a wide bandwidth frequency modulation at the termination of each pulse, storage means retaining generated pulse signals and echo pulse signals, means simultaneously reproducing the stored generated signals and reflected echo signals in inverse time order synchronizing the start of each reproduction at the termination of the stored generated and reflected signals, mixing means combining the reproduced stored signals to obtain beat signals, and means connected to the mixing means for utilizing the beat signals.

4. A pulse-echo object locator system wherein objects are located by intercepting radiant energy reflected therefrom and measuring the time delay in energy transmission comprising, means generating pulses of radio frequency energy at a duty cycle of substantially fifty percent, each of said pulses having narrow bandwidth frequency modulation at the start thereof progressing to a wider bandwidth frequency modulation at the termination thereof, first storage means retaining signals characteristic of generated pulse signals, second storage means retaining signals characteristic of received signals, means connected to the first and second storage means simultaneously reproducing the signals retained by the first and second storage devices in an inverse time manner synchronizing the start of each reproduction at the termination of the signals stored by the first and second storage devices, means mixing the reproduced stored signals to obtain beat signals, and means utilizing the beat signals.

5. A pulse-echo object locator system wherein objects are located by intercepting radiant energy reflected therefrom and measuring the time delay in energy transmission comprising, means generating pulses of radiant energy at a duty cycle of substantially fifty percent, each of said pulses having narrow bandwidth frequency modulation at the start thereof progressing to a wider bandwidth frequency modulation at the termination thereof, first storage means retaining signals characteristic of generated pulse signals, second storage means retaining signals characteristic of received signals obtained with a selected time delay from the generated pulse signals introduced by transmission to and from a selected range, means simultaneously reproducing the signals retained by the first and second storage devices in an inverse time manner synchronizing the start of each reproduction at the termination of the signals stored by the first and second storage devices, mixing means connected to the first and second storage devices for combining the reproduced stored signals to obtain beat signals, and means utilizing the beat signals.

6. A pulse-echo object locator system wherein objects are located by intercepting radiant energy reflected therefrom and measuring the time delay in energy transmission comprising, means generating pulses of radiant energy at a duty cycle of substantially fifty percent, each of said pulses having narrow bandwidth frequency modulation at the start thereof progressing to a wider bandwidth frequency modulation at the termination thereof, first storage means retaining signals characteristic of generated pulse signals, second storage means retaining signals characteristic of received signals obtained with a selected time delay introduced by transmission to and from a selected range, range sweep means connected to the storage means for periodically varying the selected time delay for successive pulses, means connected to the storage means for simultaneously reproducing the signals retained by the first and second storage devices in an inverse time manner synchronizing the start of each reproduction at the termination of the signals stored by the first and second storage devices, means mixing the reproduced storage signals to obtain beat signals, and means utilizing the beat signals.

7. A pulse-echo object locator system wherein objects are located by intercepting radiant energy reflected therefrom and measuring the time delay in energy transmission comprising, a reflex klystron oscillation generator having at least a control grid electrode and a repeller electrode, first modulator means connected to the control grid electrode operative to permit power generation by the generator on a fifty percent duty cycle basis, second modulator means connected to the repeller electrode and to the first modulator means operative to vary the repeller electrode voltage during the operative period of the generator to produce frequency modulation of the generated energy, said frequency modulation characterized by being low in frequency at the beginning of each operative period and high at its termination, first storage means connected to the oscillation generator retaining signals characteristic of generated signals, a reflected energy receiver system, second storage means connected to the receiver system retaining signals characteristic of received signals, means simultaneously reproducing the signals retained by the first and second storage devices in an inverse time manner synchronizing the start of each reproduction at the termination of the signals stored by the first and second storage devices, means mixing the reproduced stored signals to obtain beat signals, and means utilizing the beat signals.

8. A pulse echo object locator system comprising, means periodically transmitting pulses of carrier frequency energy having a time spacing substantially equal to the duration of the pulses and a carrier frequency which continuously varies from a low value at one end of the pulse to a high value at the other end of the pulse, a receiver for receiving reflections of said pulses, an electronic recording means for separately recording the carrier frequency signal characteristics of the transmitted and received pulses, a signal reproducing circuit coupled to said recording means for simultaneously and repeatedly reproducing the recorded transmitted and received signals in the reverse manner of recordation during the interval between transmitted pulses, mixing means for heterodyning the reproduced signals together to obtain beat signals, and means connected to said mixing means for utilizing the beat signals.

9. A pulse echo object locator system comprising, means periodically transmitting pulses of carrier frequency energy having a time spacing substantially equal to the duration of the pulses and a carrier frequency which continuously varies from a low value at one end of the pulse to a high value at the other end of the pulse, a receiver for receiving reflections of said pulses, first and second electronic recording means for separately recording the carrier frequency signal characteristics of the transmitted and received pulses respectively, signal reproducing circuit means coupled to said recording means for simultaneously and repeatedly reproducing similar portions of the recorded transmitted and received signals in the reverse order of recordation thereof during the interval between transmitted pulses, mixing means for heterodyning the reproduced signals together to obtain beat signals, and means connected to said mixing means for utilizing the beat signals.

References Cited

UNITED STATES PATENTS

| | | | |
|---|---|---|---|
| 2,525,328 | 10/1950 | Wolff | 343—14 X |
| 2,422,135 | 6/1947 | Sanders. | |
| 2,491,450 | 12/1949 | Holmes | 343—8 |
| 2,522,367 | 9/1950 | Guanella | 343—13 |

RICHARD A. FARLEY, *Primary Examiner.*

J. P. MORRIS, *Assistant Examiner.*

U.S. Cl. X.R.

343—17.2